(12) United States Patent
Lumppio

(10) Patent No.: US 7,258,224 B2
(45) Date of Patent: Aug. 21, 2007

(54) ARRANGEMENT FOR CONVEYING A PLATE-LIKE PRODUCT FROM ONE POSITION TO ANOTHER

(75) Inventor: Juha Lumppio, Tammipää (FI)

(73) Assignee: Outotec OyJ, Espoo (FI)

( * ) Notice: Subject to any disclaimer, the term of this patent is extended or adjusted under 35 U.S.C. 154(b) by 29 days.

(21) Appl. No.: 10/451,711

(22) PCT Filed: Dec. 11, 2001

(86) PCT No.: PCT/FI01/01078

§ 371 (c)(1),
(2), (4) Date: Jun. 19, 2003

(87) PCT Pub. No.: WO02/062684

PCT Pub. Date: Aug. 15, 2002

(65) Prior Publication Data

US 2004/0050660 A1    Mar. 18, 2004

(30) Foreign Application Priority Data

Dec. 20, 2000   (FI) .................................. 20002800

(51) Int. Cl.
B65G 47/34    (2006.01)
(52) U.S. Cl. ................... 198/468.2; 198/468.6
(58) Field of Classification Search ............. 198/468.2, 198/466.1, 750.11, 409, 468.6; 294/88, 106
See application file for complete search history.

(56) References Cited

U.S. PATENT DOCUMENTS 3,696,656 A * 10/1972 Nara et al. ..................... 72/420
3,938,672 A * 2/1976 Leiponen et al. ............ 414/729
4,273,506 A * 6/1981 Thomson et al. ............ 414/735
4,343,590 A * 8/1982 D'Aloisio ................. 414/746.8
4,414,825 A * 11/1983 Gittelbauer .................... 62/374
4,489,819 A * 12/1984 Perrin et al. ................. 198/403
4,548,544 A * 10/1985 Van Appledorn ...... 198/750.11
4,586,542 A * 5/1986 Demuth ....................... 139/439
5,064,051 A * 11/1991 Blundy ...................... 198/466.1
5,100,285 A * 3/1992 Wagner .................... 414/744.8
5,212,929 A * 5/1993 Castellan ...................... 53/149
5,249,663 A * 10/1993 McCoy et al. ............. 198/468.2
5,257,689 A * 11/1993 Lombardi et al. ......... 198/468.2
5,516,174 A * 5/1996 Squyres .................... 294/86.41
5,711,565 A * 1/1998 Smith et al. ................... 294/88
5,715,929 A * 2/1998 Scheler et al. .............. 198/375
6,244,643 B1 * 6/2001 Tillaart .................... 294/86.41
2004/0262127 A1 * 12/2004 Harnish et al. .......... 198/459.8

FOREIGN PATENT DOCUMENTS

| EP | 1 048 595 | 11/2000 |
| EP | 1 129 967 A2 | 9/2001 |
| FI | 105178 B | 6/2000 |

* cited by examiner

Primary Examiner—James R. Bidwell
(74) Attorney, Agent, or Firm—Morgan & Finnegan, LLP

(57) ABSTRACT

An arrangement for conveying an anode plate from one location to another, whereby said arrangement comprises gripping elements attached to a conveyor for gripping a plate-like piece. Elements are attached to the gripping element connection for the correction, at least partial, of any possible positional error of the anode to be transferred.

7 Claims, 3 Drawing Sheets

ARRANGEMENT FOR CONVEYING A PLATE-LIKE PRODUCT FROM ONE POSITION TO ANOTHER

This invention relates to the arrangement described in the preamble of claim 1.

The arrangement according to the invention is intended chiefly for the lifting of plate-like anodes from the casting wheel after casting and their immediate transfer to a cooling tank adjacent to the casting wheel. This method may also be used for the transfer of similar pieces between two locations relatively close to each other.

A device is disclosed in U.S. Pat. No. 3,938,672 for conveying an anode plate from the casting wheel to a cooling tank. According to this publication, the device includes grippers, which grip the anode by its lifting lugs. Comparable solutions have been presented later in U.S. Pat. Nos. 4,807,687 and 5,064,051. Devices are also known with grippers which grip the anode by the opposite side edges. In these, the gripping grapples are hinged directly to the frame of the gripping device, which is fastened rigidly onto the transfer arm. The embodiments of this prior art technology have many possibilities for error, which depend on the precision of the rotatable casting wheel and the moulds arranged on it. This potential for error is repeated when lowering the anode into the cooling tank. Typically in known solutions where the anode is gripped by its opposite edges, an intermediate station is needed, where the anodes are dropped off the conveyor, from which said intermediate station the anodes are then transferred to the cooling tank. These solutions often also have the drawback that dropping the anode into the cooling tank causes splashes of cooling liquid and a relatively large degree of steam formation, which disturbs the control of the process.

The aim of this invention is to achieve a totally new kind of solution, which will avoid the disadvantages of the prior art.

The characteristics of the invention are stated in the claims.

The embodiment of the invention has numerous important advantages. The embodiment of the invention avoids the transfer of any potential positional errors at the pickup station to the drop-off station and thus any disruptions to production due to the above-mentioned reasons. In addition the embodiment of the invention enables the anodes to be lowered directly into the cooling tank without an intermediate station or extra actuators at the drop-off station. This embodiment of the invention achieves a simple and reliable solution for the correction of anode positional errors at the conveyor stage. The solution is extremely suitable to be used particularly when handling very hot anodes. Furthermore, the embodiment of the invention allows the anode plate to be placed directly deep into the cooling tank, so there is less splashing of cooling liquid and less formation of steam.

Figure 1:
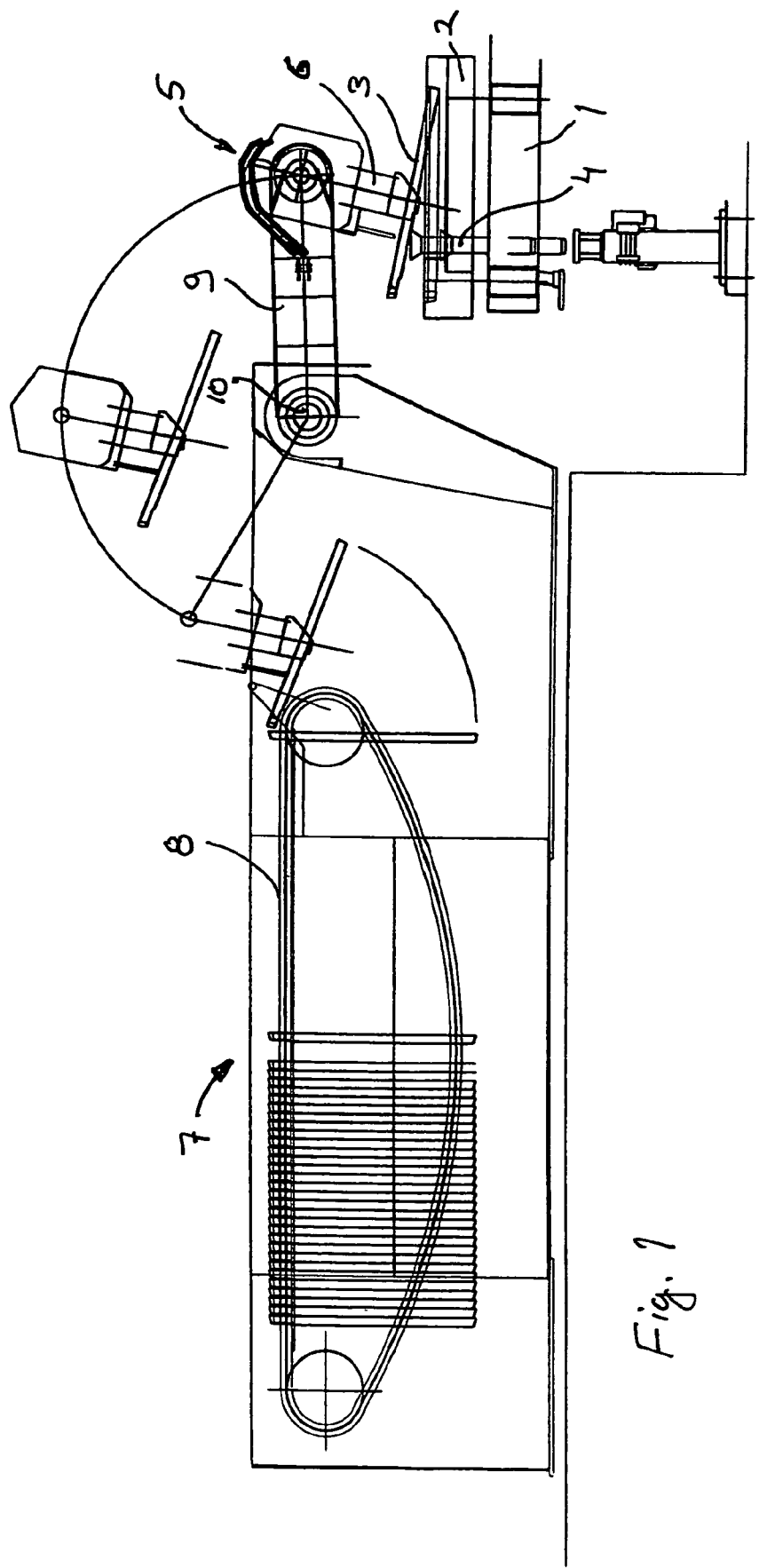
Figure 3:
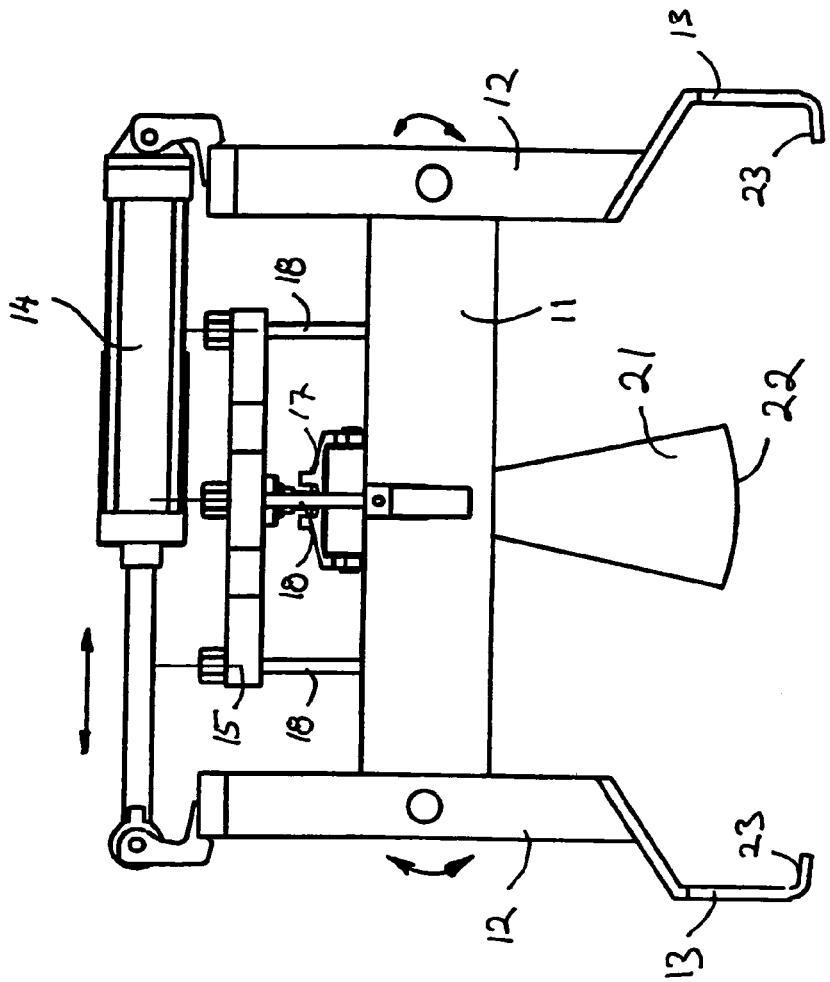
Figure 2:
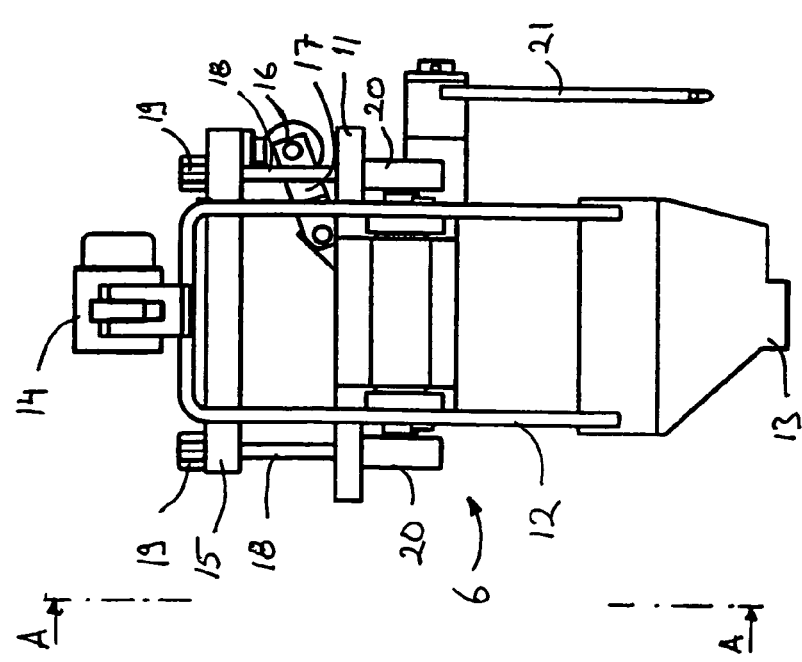

There follows a more detailed description of the invention using an example, with reference to the attached drawings, where FIG. 1 is a general view of one application for an arrangement according to this invention, FIG. 2 shows a gripping arrangement according to this invention, and FIG. 3 is a view of the gripping arrangement of FIG. 2 from the direction A-A.

Figure 4:
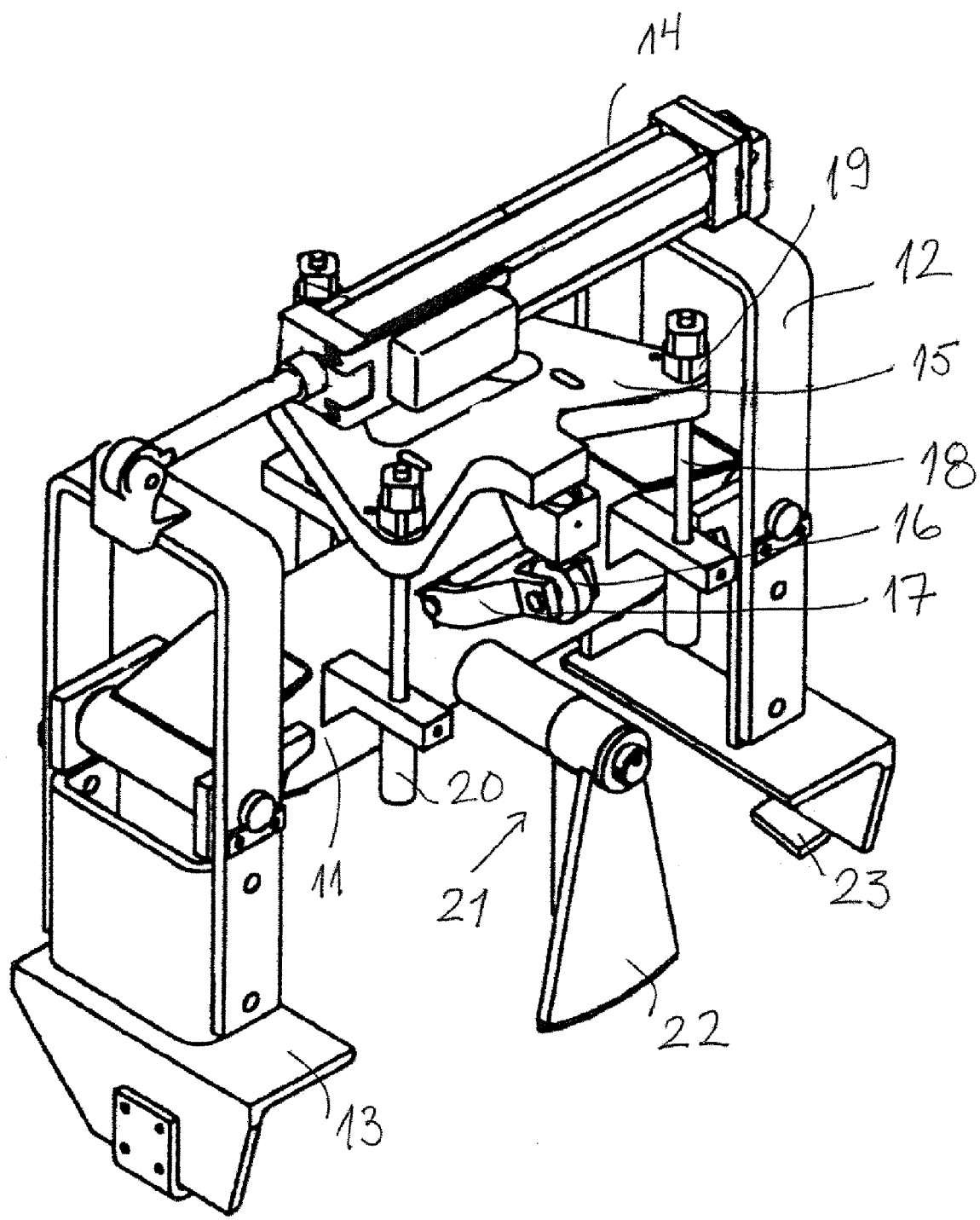

FIG. 4 is a three-dimensional view of the gripping device of FIG. 2 and FIG. 3.

The invention relates to an arrangement for conveying an anode plate from one position to another, where said arrangement includes grippers fixed onto a conveyor for gripping a plate-like piece. There are elements arranged on the gripper connection for correcting at least partially any potential positional error of the anode plate to be conveyed. The elements for correcting positional errors comprise a gripper frame or bar 11, onto which gripper arms 12 are arranged rotatably, and a fixing frame or plate 15 or the like, with which the gripper elements are attached to the conveyor, and at least one support and/or spring element 18 arranged between the fixing frame 15 and the gripper frame 11. The apparatus comprises a hinge element 16 arranged between the gripper frame 11 and the fixing frame 15, which are movable with respect to each other in relation to said pivot. The arrangement also includes at least one support and/or spring element 18. The gripper frame 11 is arranged together with the hinge element 16 and using at least one support and/or spring element 18, in particular to correct, mainly with gravitation, any positional error with respect to the fixing frame 15 at least during the anode conveying stage and at least partially. The grippers comprise grapple devices 13 on opposite edges of the anode, onto which are attached bearing surfaces 23 to carry the anode. The grippers also comprise at least one support surface 22 to support the anode on the opposite side of the anode compared with the bearing surfaces 23 of the grapple device. There are three support and/or spring elements 18. The support and/or spring element 18 is a rod, wire, chain or cable device. The support and/or spring element 18 is a spring device.

One application of the arrangement according to this invention is shown in FIG. 1. The arrangement here is adapted for a typical anode casting apparatus. The anode casting wheel 1 is shown only partially in the drawing in simplified form. A casting mould 2 is arranged on a rotatable wheel 1, and molten metal is poured into said mould in the casting stage. The metal solidifies and a cast anode 3 can be removed from the mould using for example apparatus according to the present invention. Connected to the anode casting wheel is a lifting device 4, preferably a lifting pin, with which the anode is at least partially lifted upwards from the casting mould 2. The gripping device 6 of conveyor 5 grips the anode plate 3 by its edges and moves the anode away from the casting wheel. In the application shown in the drawing the anode is transferred to the cooling tank 7. Typically the anode is set hanging down from its lugs into the cooling tank, more suitably onto its conveying element, counter device 8, such as a chain conveyor. The anode is transferred in the case of the drawing in almost horizontal position to the chain conveyors 8, where the gripping device 6 of conveyor 5 lets the anode drop into a vertical position. The conveyor in this case comprises one transfer arm 9, which is arranged to rotate essentially around a horizontal pivoted shaft 10. Alternatively the conveyor could comprise a vertical shaft, around which the transfer arm would be arranged to rotate. There could also be more than one transfer arm.

FIGS. 2 and 3 show the gripping device 6 detached from the transfer arm of the conveyor. The gripping device 6 comprises a gripper frame 11, onto which the gripper arms 12 are arranged at opposite ends. On the lower end of the gripper arms 12 there are arranged grapple devices 13, which grip the anode plate by its edges. The gripper arms 12 are moved by an operating device 14, for example by a pressure-operated (hydraulic) cylinder-piston combination, fixed on the upper end of the gripper arms 12, most suitably between them. Thus the first end of the cylinder-piston combination is fixed, typically hinged, to the upper part of the first gripper arm and correspondingly the other end of the cylinder-piston combination is fixed, typically hinged, to the upper end of the second gripper arm. The gripper frame 11 is fixed preferably hinged onto the fixing frame 15, where there is a fixing point to the transfer arm of the conveyor. Fixtures are arranged between the gripper frame 11 and the fixing frame 15 to support the gripper frame. The support fixtures allow the gripper frame to move in relation to the pivot. In the application shown in the drawing the pivot comprises a hinge element 16 fixed on the fixing frame, onto which hinge element the support arm 17 of the gripper frame is fixed in a hinged way. On lifting the gripper with the conveyor the gripper frame 11 is suspended floating and is supported by at least one point. In the case illustrated, three support elements 18 are arranged between the gripper frame 11 and the fixing frame 15, allowing the movement of the gripper frame 11 towards the fixing frame 15 and the rotation of the gripper frame around the pivot. The support elements 18 are typically flexible or bendable at least in their sideways direction e.g. wire elements, which are arranged on the fixing frame 15 so as to allow movement.

The "floating" gripper frame solution of this invention enables that the gripper frame 11 always searches for essentially the same position under the effect of gravity when the anode 3 is lifted by the gripper. Thanks to this characteristic, the device is able to lift anodes from the casting wheel that are in a slightly faulty position. With the gripper solution of this invention at the lifting stage the anodes are centred in relation to the fixing frame 15. In the application shown in the drawings, the support elements 18 are wire elements attached at their lower end to the gripper frame 11 and at their upper end to the fixing frame 15. The fastening of the upper end comprises for example in the case illustrated an aperture made in the fixing frame through which the support wire is threaded and a counter device 19, with a diameter larger than the hole attached to the wire which bears the gripper frame by supporting the corresponding support surface of the fixing frame 15. The lower end of the wire element 18 is correspondingly attached to the gripper frame 11 through the hole. A counter device 20 is attached to the end of the wire, so that the gripper frame 11 is at least partially supported by the counter device 20 of the lower part of the wire element. The solution of this embodiment facilitates extremely versatile opportunities for adjustment at the equipment installation stage.

An anode counter device 21 is attached to the gripper frame 11, which has a counter surface 22 in order to hold the anode in the desired position when on the gripper. The anode is held in the gripper by its lower surface by the bearing surfaces 23 of the grapple element, so that the upper surface of the anode is supported by the counter surface 22 of the counter device 21. Preferably the bearing surfaces 23 of the grapple element 13 are on opposite sides of the anode and more suitably in relation to the mass centre of the anode on the side of the anode lugs, so that when lifting the anode its torque makes it turn the anode end on the side of the lugs towards the counter device 21. Arranging the counter device 21 to rotate enables the correction of any error in angle of the anode at the lifting stage. The counter surface 22 of the counter device 21 is curved in the application showed in FIG. 3 and the counter device is hinged so that the distance between the upper surface of the anode and the frame of the device remains the same in all conditions.

The apparatus functions typically as follows. As the rotation device of the casting wheel turns, the casting mould 2 is positioned in the anode pick-off station, so that lifting pins 4 raise the anode 3 out of the mould. The conveyor 5 with its gripping device 6 moves to the anode. At this point the gripper arms 12 are in the open position, slightly free of the mould so that the grapple element 13 bearing surfaces 23 are below the lower surface of the anode 3. The grapple elements 13 are moved by the cylinder-piston unit 14 into the gripping position and the conveyor 5 transfers the anode 3 for further processing, such as a cooling tank 7. During transfer, any possible positional error is corrected and the anode can be lowered into the cooling tank by the counter device 8 in the desired position. The grapple elements 13 open and the anode remains suspended from its lugs in the cooling tank 7 by the counter device 8. The conveyor with its gripper apparatus returns to the ready position in preparation for picking up the next anode.

The invention claimed is:

1. An apparatus for conveying an anode plate from one location to another, said apparatus comprising:
    a conveyor; and
    a gripping device, the gripping device comprising:
        a fixing plate for providing support for elements of the apparatus and for attachment of the elements of the apparatus to the conveyor;
        a gripper bar supported by the fixing plate and by at least one support element, said support element, wherein said support element allows the gripper bar to be suspended;
        a hinge element arranged between the gripper bar and the fixing plate, the hinge element defining an axis about which the gripper bar can rotate relative to the fixing plate;
        gripping elements for gripping the anode plate, each gripping element being pivotally attached to the gripper bar and moved by an operating device;
        grapple devices having bearing surfaces attached to a lower end of each gripping element, the grapple devices being capable of engaging the anode on opposite edges thereof; and
        an anode counter device having at least one support surface for acting in conjunction with the grapple devices and bearing surfaces to contact an upper surface of the anode in a substantially horizontal position during conveyance of the anode by the conveyor,
    wherein the anode counter device is hinged such that the distance between the upper surface of the anode and the gripper bar remains the same in all conditions.

2. The apparatus according to claim 1, comprising at least two of the said support elements.

3. The apparatus according to claim 1, wherein the gripper bar is connected to the fixing plate by the hinge element and the at least one support element, and is capable of at least partially correcting a positional error of the anode with respect to the fixing plate, at least during the conveyance of the anode, by the way of gravitational pull acting on the anode and gripping elements, the gravitational pull causing the anode and the gripping elements to align with the fixing plate by the at least one support element and hinge element.

4. The apparatus according to claim 1, wherein the gripper bar comprises at least one support surface to support the anode, the support surface being arranged on the gripping elements so that the support surface and the bearing surface contact opposite sides of the anode.

5. The apparatus according to claim 1, having three support and/or spring elements.

6. The apparatus according to claim 1, wherein the support or spring element is a rod, wire, chain or cable device.

7. The apparatus according to claim 1, wherein the support element is a spring device.

* * * * *